3,849,572
BIPHENYLENEACETIC ACID ANTI-INFLAMMATORY AGENTS

Bruce E. Witzel and Tsung-Ying Shen, Westfield, N.J., assignors to Merck & Co., Inc., Rahway, N.J.
No Drawing. Continuation-in-part of abandoned application Ser. No. 72,531, Sept. 15, 1970. This application July 19, 1972, Ser. No. 273,232
Int. Cl. A61k 27/00
U.S. Cl. 424—304                                       4 Claims

ABSTRACT OF THE DISCLOSURE

Novel biphenyleneacetic acids and derivatives thereof which are useful in the treatment of inflammation. Also included are processes for the preparation of the biphenyleneacetic acid materials and therapeutic compositions and methods of treatment employing said agents.

---

This application is a continuation-in-part of United States application Ser. No. 72,531, filed Sept. 15, 1970, now abandoned.

This invention concerns new substituted biphenyleneacetic acids and derivatives and processes for preparing these compounds. A method of treatment using this novel class of biphenyleneacetic acids as medicinal agents and therapeutic compositions containing said acids is also described. The compounds of this invention exhibit anti-inflammatory activity and provide a method of treatment of inflammation. They also possess an effective degree of anti-pyretic and analgestic activity.

There has been much research carried on in the past for development of anti-inflammatory drugs. As a result, a great many new drugs have been synthesized but most of these have been in the steroid or indole series.

We have unexpectedly found that the substituted biphenyleneacetic acids of this invention, which are structurally unrelated to the steroid and indole series, are valuable anti-inflammatory agents.

This invention describes new chemical compounds which contain an acetic acid side chain or derivative thereof which is attached to one of the phenyl rings of a biphenylene system.

More specifically, this invention describes a novel class of chemical compounds having the structural formula as shown in FIGURE I:

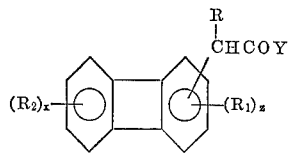

FIGURE I where

R is hydrogen, methylene, alkyl, alkoxy, alkenyl, alkylamino or haloalkyl;
$R_1$ and $R_2$ may be the same or different and may be at any position on the ring and are hydrogen, halogen, nitro, amino, alkylamino, dialkylamino, acylamino, cyano, carboxy, carbalkoxy, carbamyl, alkenyloxy, alkoxy, alkenyl, alkyl, mercapto, alkylthio, alkylsulfinyl, alkylsulfonyl, sulfonamido, sulfinamido, methylenedioxy, trihaloalkyl, aryl, aralkyl, aryloxy, aralkoxy, hydroxy, hydroxyalkyl, haloalkyl, mercaptoalkyl, alkylmercaptoalkyl, aminoalkyl, alkylaminoalkyl, dialkylaminoalkyl, alkoxyalkyl, acyl or acyloxy;
wherein X=1–4 and Z=1–3.
Y is —OH, —NH$_2$, alkylamino, dialkylamino, cycloalkylamino, N-heterocyclo, alkoxy, aralkoxy, metaloxy or aryloxy.

In the above descriptive portions of the following definitions apply:

"Ar" or "aryl" is any benzeneoid or nonbenzenoid aromatic-like structure as phenyl, naphthyl, athracene, styryl, etc.

"Alk" refers to a hydrocarbon having up to about seven carbon atoms which may be straight chained or branched.

"Heterocyclo" is a radical which may be formed from the nitrogen of any heterocyclic ring system containing nitrogen and one or more S, O or N atoms and include such as piperidino, morpholino, piperazino, homopiperazino, pyrroledino, indolyl, tetrahydrothiazolyl, etc.

"Acyl" refers to alkanoyl, aryloyl or aralkanoyl.

"Metal" refers to any base which will form an acid addition salt with a carboxylic acid and whose pharmacological properties will not cause an adverse physiological effect when ingested by the body system such as alkali, alkaline earth, aluminum metal or any organic cation formed from a positively charged atom or radical such as cyclohexylamine, triethylamine, phenethylamine, etc.

"Cycloalk" refers to a hydrocarbon ring having up to about seven carbon atoms.

This invention also involves a novel method of treating inflammation and of therapeutic compositions, which comprises the administration to a human or animal such as horse, dog, cat, sheep, etc. of a substituted biphenyleneacetic acid compound having the structural formula as shown in FIG. I.

The preferred compounds for treating inflammation fever and pain and for use in therapeutic compositions embrace those compounds of structural Formula II:

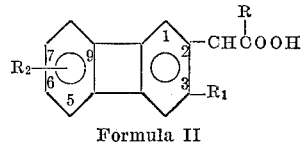

Formula II where

R is hydrogen or alkyl;
$R_1$ is hydrogen, dialkylamino, fluoro, chloro, acetyl, alkyl, alkoxy or hydroxy;
$R_2$ is hydrogen, cyano, fluoro, acetyl, chloro, nitro, amino, dialkylamino, monoalkylamino, alkoxy, mercapto, alkylthio, alkylsulfinyl, trifluoromethyl, alkenyloxy, alkylsulfonyl or hydroxy;

wherein $R_2$ is at the 6- and/or 7-position. Representative compounds of this invention are as follows:

biphenylene-2-acetic acid
α-(2-biphenylene)-propionic acid
biphenylene-1-acetic acid
α-(1-biphenylene)-propionic acid
3-methoxybiphenylene-2-acetic acid
3-hydroxybiphenylene-2-acetic acid
3-methylbiphenylene-2-acetic acid
6-acetylbiphenylene-2-acetic acid
3,6-dimethoxybiphenylene-2-acetic acid
3,6-dihydroxybiphenylene-2-acetic acid
6-hydroxybiphenylene-2-acetic acid
6-nitrobiphenylene-2-acetic acid
6-dimethylaminobiphenylene-2-acetic acid
6-mercaptobiphenylene-2-acetic acid
6-methylthiobiphenylene-2-acetic acid
6-methylsulfinylbiphenylene-2-acetic acid
6-cyanobiphenylene-2-acetic acid
3-hydroxy-6-methylsulfinylbiphenylene-2-acetic acid
6-methylaminobiphenylene-2-acetic acid
7-methylbiphenylene-2-acetic acid
5-fluorobiphenylene-2-acetic acid
6-fluorobiphenylene-2-acetic acid
4-fluorobiphenylene-2-acetic acid α-(4-fluorobiphenylene-2)-propionic acid
6,7-dimethoxybiphenylene-2-acetic acid
6-methoxybiphenylene-2-acetic acid
6,7-difluorobiphenylene-2-acetic acid
6-methoxy-7-fluorobiphenylene-2-acetic acid
6-methoxy-7-cyanobiphenylene-2-acetic acid
6-trifluoromethylbiphenylene-2-acetic acid.

In view of the fact that the novel compounds of this invention exercise anti-inflammatory, analgesic and anti-pyretic activity they are indicated for a wide variety of mammalian conditions where one or more of the symptoms of inflammation, fever and pain are manifested. Exemplary of such conditions are rheumatic diseases for example, rheumatoid arthritis, osteoarthritis, and other degenerative joint diseases, psoriatic arthritis, ankylosing spondylitis, gout and rheumatic fever; soft tissue rheumatism, for example, tendinitis, periarthritis and periostitis; acute muscular rheumatism, for example sciatica and the like; treatment of pain after fractures, pain and inflammation associated with dental surgery, and the like, human and veterinary disease conditions exhibiting the foregoing symptoms requiring the use of an anti-inflammatory, analgesic and/or anti-pyretic pharmaceutical composition.

The compounds of this invention may be in a form suitable for oral use, for example, as tablets, aqueous or oil suspensions, dispersible powders or granules, emulsions, hard or soft capsules, or syrups or elixirs. Compositions intended for oral use may be prepared according to any method known to the art for the manufacture of pharmaceutical compositions and such compositions may contain one or more agents selected from the group consisting of sweetening agents, flavoring agents, coloring agents and preserving agents, in order to provide a pharmaceutically elegant and palatable preparation. Tablets which contain the active biphenyleneacetic acids ingredient in admixture with non-toxic pharmaceutically acceptable excipients are suitable for the manufacture of tablets. These excipients may be, for example, inert diluents, for example, calcium carbonate, sodium carbonate, lactose, calcium phosphate or sodium phosphate; granulating and disintegrating agents, for example, maize starch or alginic acid; binding agents, for example, starch, gelatin or acacia; and lubricating agents, for example, magnesium stearate, steric acid or talc. The tablets may be uncoated or they may be coated by known techniques to delay disintegration and absorption in the gastro-intestinal tract and thereby provide a sustained action over a longer period.

Formulations for oral use may also be presented as hard gelatin capsules wherein the active ingredient is mixed with an inert solid diluent, for example, calcium carbonate, calcium phosphate or kaolin, or as soft gelatin capsules wherein the active ingredient is mixed with an oil medium, for example, arachis oil, liquid paraffin or olive oil.

Aqueous solutions containing the active biphenyleneacetic acids form a further embodiment of this invention. Excipients suitable for aqueous suspensions may be employed if desired. These excipients are suspending agents, for example, sodium carboxymethylcellulose, methyl cellulose, hydroxypropylmethylcellulose, sodium alginate, polyvinylpyrrolidone, gum tragacanth and gum acacia; dispersing or wetting agents may be a naturally-occurring phosphatide, for example, lecithin; or condensation products of an alkylene oxide with fatty acids, for example, polyoxyethylene stearate; or condensation products of ethylene oxide with long-chain aliphatic alcohols, for example, heptadecaethyleneoxy cetanol; or condensation products of ethylene oxide with partial esters derived from fatty acids and a hexitol, for example, polyoxyethylene sorbitol monooleate; or condensation products of ethylene oxide with partial esters derived from fatty acids and hexitol anhydrides, for example, polyoxyethylene sorbitan monooleate. The said aqueous suspensions may also contain one or more preservatives, for example, ethyl, or n-propyl, p-hydroxy benzoate, one or more coloring agents, one or more flavoring agents, and one or more sweetening agents, such as sucrose.

Oily suspensions may be formulated by suspending the active ingredient in a vegetable oil, for example, arachis oil, olive oil, sesame oil or coconut oil, or in a mineral oil, such as liquid paraffin. The oily suspensions may contain a thickening agent, for example, beeswax, hard paraffin or cetyl alcohol. Sweetening agents, such as those set forth above, and flavoring agents may be added to provide a palatable oral preparation. These compositions may be preserved by the addition of an anti-oxidant such as ascorbic acid.

Dispersible powders and granules suitable for preparation of an aqueous suepension by the addition of water provide the active ingredient in admixture with a dispersing or wetting agent, suspending agent and one or more preservatives. Suitable dispersing or wetting agents and suspending agents are exemplified by those already mentioned above. Additional excipients, for example, sweetening, flavoring and coloring agents may also be present.

The compounds of this invention may also be in the form of oil-in-water emulsions. The oily phase may be a vegetable oil, for example, olive oil or arachis oils, or a mineral oil, for example, liquid paraffin or mixtures of these. Suitable emulsifying agents may be naturally-occurring gums, for example, gum acacia or gum tragacanth, naturally-occurring phosphatides, for example, soya bean lecithin, and esters of partial esters derived from fatty acids and hexitol anhydrides, for example, sorbitan monooleate, and condensation products of the said partial esters with ethylene oxide, for example, polyoxyethylene sorbitan mono-oleate. The emulsions may also contain sweetening and flavoring agents.

Syrups and elixirs may be formulated with sweetening agents, for example, glycerol, sorbitol or sucrose. Such formulations may also contain a demulcent, a preservative and flavoring and coloring agents. The pharmaceutical compositions may be in the form of a sterile injectable preparation, for example, as a sterile injectable aqueous suspension. This suspension may be formulated according to the known art using those suitable dispersing or wetting agents and suspending agents which have been metioned above. The sterile injectable preparation may also be a sterile injectable solution or suspension in a non-toxic parenterally-acceptable diluent or solvent, for example, as a solution in 1:3-butane diol.

The biphenyleneacetic acids of this invention may also be administered in the form of suppositories for rectal administration of the drug. These can be prepared by mixing the drug with a suitable non-irritating excipient which is solid at ordinary temperatures, but liquid at the rectal temperature and will therefore melt in the rectum to release the drug. Such materials are cocoa butter and polyethylene glycols.

Further, these compounds may be tableted or otherwise formulated so that for every 100 parts by weight of the composition, there are present between 5 and 95 parts by weight of the active ingredient, and preferably between 25 and 85 parts by weight of the active ingredient. The dosage unit form will generally contain between about 50 mg. and about 500 mg. of the active ingredient of the formula stated above.

From the foregoing formulation discussion, it is apparent that the compounds of this invention can be administered orally, parenterally, topically and rectally. The term parenteral as used herein includes subcutaneous injection, intravenous, intramuscular, or intrasternal injection or infusion techniques.

The dosage regimen in carrying out the methods of this invention is that which insures maximum therapeutic response until improvement is obtained and thereafter is the minimum effective level which gives relief. Thus, in general, the dosages are those that are therapeutically effective in the treatment of disease conditions or symptoms, such as inflammation, pain and fever. In general, the daily oral dose for an animal or human is between about 0.5 mg./kg. and 70 mg./kg., bearing in mind, of course, that in selecting the appropriate dosage in any specific case, consideration must be given to the patient's weight, general health, age and other factors which may influence response to the drug. A typical dosage for an adult human would involve 3–6 capsules a day at mealtimes, each capsule containing 50 mg. of the active ingredient.

It is expected that the biphenyleneacetic acids of this invention will generally be administered in dosage units of between 5 and 500 mg. of active ingredient. Preferred compositions for ease of administration are in oral dosage unit form, for example, tablets or capsules, containing between 25 and 250 mg. of the biphenyleneacetic acids of this invention.

The compounds of this invention may be conveniently prepared by the following general method. When a substituted acetylbiphenylene compound is subjected to the conditions of the Wilhgerodt-Kindler reaction followed by hydrolysis then the desired substituted biphenyleneacetic acid product is prepared. If the ketone is heated with an equimolar amount of sulfur and an anhydrous amine the thioamide is formed which can then be hydrolyzed in the usual manner to the acid. The amine used may be one which is a primary or a secondary amine of the formula HNR'R'' where R' and R'' may be the same or different and may be alkyl, alkenyl, aralkyl, aryl, or a heterocyclic chain which will form an amine ring such as piperidine, morpholine, etc. This reaction is described by the following reaction sequence:

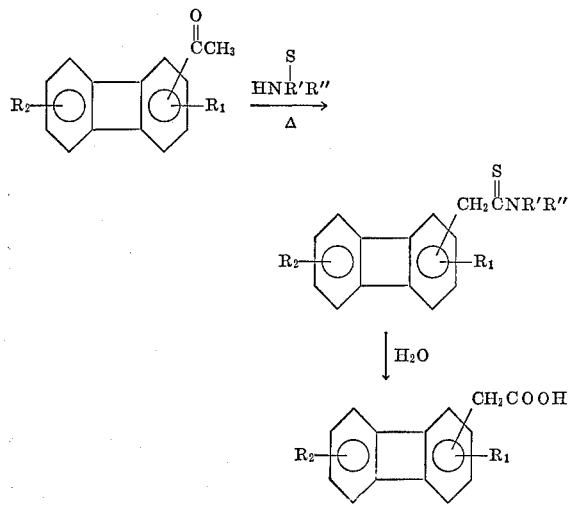

The 2-substituted biphenyleneacetic acid compounds may further be prepared by the hydrolysis of the corresponding nitrile in the usual manner. This is described by the following reaction equation:

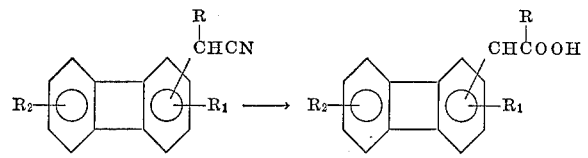

One such method of hydrolysis is by heating in acid solution such as sulfuric acid.

The ester and amide derivatives of the carboxylic acid products can be prepared by conventional methods well known to those skilled in the art. Thus, for example, the ester derivatives may be prepared by the reaction of a biphenyleneacetic acid with an alcohol such as with an alkyl or aralkyl alcohol in the presence of a suitable catalyst such as the presence of sulfuric acid, boron trifluoride etherate, by hydrogen chloride gas, etc. or, alternatively, the biphenyleneacetic acid may be converted to its acid halide by conventional methods and the acid halide thus formed reacted with an appropriate alkanol ar aralkanol. The methyl ester is obtained employing diazomethane.

The compounds of this invention, wherein Y is a group such that an amide is the final compound (i.e., Y is amino), may be prepared by any suitable amidation reaction. For example, the acid compound (preferably the methyl or ethyl ester) may be reacted with ammonia, ammonium hydroxide, or an amine compound, at any suitable temperature (room temperature to reflux). When the amino group is desired, it is preferred to carry out the reaction with ammonia in a bomb at temperatures above 100° C. to form the desired Y (amino) compound. Preferably, when an amide is desired which is derived from an amino acid, the following reaction sequence is followed: The benzoic acid final compound is reacted with isobutyl chloroformate to form the mixed anhydride. This compound is in turn reacted with the desired amino acid ester and subsequently hydrolyzed to form the desired amide.

Appropriately desired end products having various R, $R_1$, and $R_2$ substituents can be prepared using suitable reactions in order to convert one group to another. Thus, for example, using conventional methods a halogen group can be converted under normal conditions to the nitrile compound which in turn can be hydrolyzed to a carboxy. Formation of the acid halide followed by alkylation affords the alkanoyl groups. A nitro can be reduced to an amino group and a hydroxy compound can be prepared by demethylation of a methoxy substituent. Mercapto groups can be converted into alkylthio or arylthio groups using conventional methods and can further be oxidized to the sulfinyl and sulfonyl compounds. Examples of the substituted biphenylene-acetic and propionic acids which may be made from other acids of the invention via displacement, addition, etc. reactions are as follows: Treatment of methyl 6-bromo (or chloro) biphenylene-2-acetate with cuprous cyanide in N-methylpyrrolidine yields the corresponding 6-cyano derivative. Reaction of methyl 6-carboxybiphenylene-2-acetate with sulfur tetrafluoride yields the 6-trifluoromethyl analog. Oxidation of 6-methylthiobiphenylene-2-acetic acid with sodium metaperiodate in acetone-water yields the 6-methylsulfinyl derivative. Alkylation of the hydroxy and amino derivatives yields the corresponding alkoxy and alkylamino analogs.

This invention further relates to the acid addition salts found by the action of a suitable base with a carboxylic acid. Suitable bases thus include, for example, the alkali metal alkoxide such as sodium methoxide, etc. and the alkali metal and alkaline earth metal hydroxides, carbonates, bicarbonates etc. (such as sodium hydroxide, potassium hydroxide, calcium hydroxide, potassium carbonate, magnesium bicarbonate, etc.). Also, the aluminum salts of the instant products may be obtained by treating the corresponding sodium salt with an appropriate aluminum complex such as aluminum chloride hexahydrate, etc.

Representative salts, esters and amides are as follows:

methyl biphenylene-2-acetate
ethyl α-(2-biphenylene)-propionate
propyl biphenylene-1-acetate
t-butyl α-(1-biphenylene)-propionate
methyl 3-methoxybiphenylene-2-acetate
propyl 3-hydroxybiphenylene-2-acetate
N-methyl 3-methylbiphenylene-2-acetamide
N-ethyl 6-acetylbiphenylene-2-acetamide
N,N-dimethyl 3,6-dimethoxybiphenylene-2-acetamide
3,6-dihydroxybiphenylene-2-acetmorpholide
sodium 6-hydroxybiphenylene-2-acetate
potassium 6-nitrobiphenylene-2-acetate
calcium 6-dimethylaminobiphenylene-2-acetate
sodium 6-mercaptobiphenylene-2-acetate
aluminum 6-methylthiobiphenylene-2-acetate phenyl 6-methylsulfinylbiphenylene-2-acetate
benzyl 6-cyanobiphenylene-2-acetate
phenethyl 3-hydroxy-6-methylsulfinylbiphenylene-2-acetate
6-(methylamino) biphenylene-2-acetpiperazide
methyl α-(3-methyl-2-biphenylenyl) pionate
sodium α-(3-methoxy-2-biphenylenyl) propionate
N,N-diethyl α-(3-chloro-2-biphenylenyl) propionamide
ethyl α-(3-bromo-2-biphenylenyl) propionate
α-(3-amino-2-biphenylenyl) propionamide
N-methyl α-(3-dimethylamino-2-biphenylenyl) propionamide
propyl α-(3-mercapto-2-biphenylenyl) propionate
α-(3-methylthio-2-biphenylenyl) propiomorpholide
calcium α-(3-phenyl-2-biphenylenyl) propionate
benzyl α-(3-benzyl-2-biphenylenyl) propionate
n-butyl α-(3,6-dimethoxy-2-biphenylenyl) propionate
ethyl α-(3,6-dihydroxy-2-biphenylenyl) propionate
potassium α-(3,6-dichloro-2-biphenylenyl) propionate
phenethyl α-(6-methoxy-2-biphenylenyl) propionate

EXAMPLE 1

Biphenylene-2-acetic acid

A mixture of 2-acetylbiphenylene (2.0 g., 0.015 m.), sulfur (0.85 g.) and dried morpholine (7 ml.) is refluxed under a nitrogen atmosphere for 24 hours, allowed to cool, added to 105 ml. of an aqueous potassium hydroxide solution (from 27 g. potassium hydroxide in 128 ml. water), transferring with a small amount of fresh morpholine, the aqueous mixture filtered hot, and the cake washed with additional water. The filtrate is then ice-cooled, acidified slightly with concentrated hydrochloric acid, keeping the temperature of the mixture below 14° C. by external cooling and addition of small amounts of ice to the solution. After stirring several hours, the mixture is re-cooled to 5° C., filtered, the crude product washed well with water, dried, boiled twice with excess methylene chloride, the extracts filtered and concentrated to 1.7 g.' of biphenylene-2-acetic acid, I.R. identical to analytical material, m.p. 168–174° C. (Benzene).

When the compounds of Table I below are substituted for 2-acetylbiphenylene in the above example, then the corresponding product of Table II below is obtained.

TABLE I 2-acetyl-3-methylbiphenylene
2-acetyl-3-methoxybiphenylene
2-acetyl-3-chlorobiphenylene
2-acetyl-3-bromobiphenylene
2-acetyl-6-fluorobiphenylene
2-acetyl-6-trifluoromethylbiphenylene
2-acetyl-3-dimethylaminobiphenylene
2-acetyl-3-methylthiobiphenylene
2-acetyl-6-phenylbiphenylene
2-acetyl-6-benzylbiphenylene
2-acetyl-3,6-dimethoxybiphenylene
2-acetyl-3,6-dihydroxybiphenylene
2-acetyl-3,6-dichlorobiphenylene
2-acetyl-6-methoxybiphenylene

TABLE II 3-methylbiphenylene-2-acetic acid
3-methoxybiphenylene-2-acetic acid
3-chlorobiphenylene-2-acetic acid
3-bromobiphenylene-2-acetic acid
6-fluorobiphenylene-2-acetic acid
6-trifluoromethylbiphenylene-2-acetic acid
3-dimethylaminobiphenylene-2-acetic acid
3-methylthiobiphenylene-2-acetic acid
6-phenylbiphenylene-2-acetic acid
6-benzylbiphenylene-2-acetic acid
3,6-dimethoxybiphenylene-2-acetic acid
3,6-dihydroxybiphenylene-2-acetic acid
3,6-dichlorobiphenylene-2-acetic acid
6-methoxybiphenylene-2-acetic acid

EXAMPLE 2

2-(α-Hydroxyethyl)-biphenylene

To an ice-cooled suspension of 2-acetylbiphenylene (1.0 g., 0.005 m.) in ethanol (ca. 40 ml.) is added a partial solution of sodium borohydride (0.2 g.) in ethanol (5 ml.)-water (0.5 ml.) over about 1 minute. Upon allowing the mixture to warm to room temperature, solution occurs. After stirring overnight, water (50 ml.) is added, the mixture stirred an additional 3 hrs., the ethanol removed in vacuo (room temperature), filtered, the solid washed with water and dried to give 2-(α-hydroxyethyl)-biphenylene.

When the compounds of Table II, Example 1 are substituted in the above example for 2-acetylbiphenylene, then the products prepared as shown in Table III below:

TABLE III 2-(α-Hydroxyethyl)-3-methylbiphenylene
2-(α-Hydroxyethyl)-3-methoxybiphenylene
2-(α-Hydroxyethyl)-3-chlorobiphenylene
2-(α-Hydroxyethyl)-3-bromobiphenylene
2-(α-Hydroxyethyl)-6-fluorobiphenylene
2-(α-Hydroxyethyl)-6-trifluoromethylbiphenylene
2-(α-Hydroxyethyl)-3-dimethylaminobiphenylene
2-(α-Hydroxyethyl)-3-methylthiobiphenylene
2-(α-Hydroxyethyl)-6-phenylbiphenylene
2-(α-Hydroxyethyl)-6-benzylbiphenylene
2-(α-Hydroxyethyl)-3,6-dimethoxybiphenylene
2-(α-Hydroxyethyl)-3,6-dihydroxybiphenylene
2-(α-Hydroxyethyl)-3,6-dichlorobiphenylene
2-(α-Hydroxyethyl)-6-methoxybiphenylene

EXAMPLE 3

2-(α-Bromoethyl)-biphenylene

To a well-stirred partial solution of 2-(α-hydroxyethyl)-biphenylene (1.0 g.) in dry benzene (15 ml.) at 5° C. is added gaseous hydrogen bromide, the bubbling in at such a rate as to keep the temperature less than 11° C. After ca. ten minutes, hydrogen bromide vapor is visible at the mouth of the drierite exit tube protecting the mixture. The rate of addition is increased and addition continued for an additional 35 min., keeping the temperature between 3–8° C. The green mixture is then transferred to a separatory funnel, the benzene solution separated from the water formed during the reaction, dried over anhydrous sodium sulfate-darco (stirring), filtered and concentrated in vacuo (bath temperature no greater than 40° C.) to a yellow wax, which after pumping all night at room temperature weighs 1+ g. The crude 2-(α-bromoethyl)-biphenylene is used as-is in the following example.

When the compounds of Table III, Example 2 are substituted in the above example for 2-(α-hydroxyethyl)-biphenylene then the products prepared are shown in Table IV below:

TABLE IV 2-(α-bromoethyl)-3-methylbiphenylene
2-(α-bromoethyl)-3-bromobiphenylene
2-(α-bromoethyl)-3-chlorobiphenylene
2-(α-bromoethyl)-6-fluorobiphenylene
2-(α-bromoethyl)-6-trifluoromethylbiphenylene
2-(α-bromoethyl)-3-dimethylaminobiphenylene hydrobromide
2-(α-bromoethyl)-3-methylthiobiphenylene
2-(α-bromoethyl)-6-phenylbiphenylene
2-(α-bromoethyl)-6-benzylbiphenylene
2-(α-bromoethyl)-3,6-dimethoxybiphenylene
2-(α-bromoethyl)-3,6-dihydroxybiphenylene
2-(α-bromoethyl)-3,6-dichlorobiphenylene
2-(α-bromoethyl)-6-methoxybiphenylene

EXAMPLE 4

α-(2-Bisphenylenyl)-propionitrile

To a stirred mixture of sodium cyanide (0.4 g.) in dry dimethylsulfoxide (5 ml.) at 64° C. (bath temperature) is added 2-(α-bromoethyl)-biphenylene (1.0 g.) in small portions over one hour. After all is added, the bath is raised to 77±2° C. and the mixture kept one hour. After cooling, water is added and the fluid mixture extracted well with methylene chloride. The organic phase is then washed, three times with water, dried over magnesium sulfate darco, filtered, and concentrated to a deep yellow-red oil of α-(2-biphenylenyl)-propionitrile.

When the compounds of Table IV, Example 3 are substituted in Example 4 for 2-(α-bromoethyl)-biphenylene, then the products prepared are shown in Table V.

TABLE V 2-(3-methyl-2-biphenylenyl)-propionitrile
2-(3-bromo-2-biphenylenyl)-propionitrile
2-(3-chloro-2-biphenylenyl)-propionitrile
2-(6-fluoro-2-biphenylenyl)-propionitrile
1-(6-trifluoromethyl-2-biphenylenyl)-propionitrile
2-(3-dimethylamino-2-biphenylenyl)-propionitrile
2-(3-methylthio-2-biphenylenyl)-propionitrile
2-(6-phenyl-2-biphenylenyl)-propionitrile
2-(6-benzyl-2-biphenylenyl)-propionitrile
2-(3,6-dimethoxy-2-biphenylenyl)-propionitrile
2-(3,6-dihydroxy-2-biphenylenyl)-propionitrile
2-(3,6-dichloro-2-biphenylenyl)-propionitrile
2-(6-methoxybiphenylenyl)-propionitrile

EXAMPLE 5

α-(2-Biphenylenyl)-propionic acid

A mixture of α-(2-biphenyenyl)-propionitrile (0.01 m.), glacial acetic acid (50 ml.), sulfuric acid (10 ml.) and water (10 ml.) is heated under reflux for 20 hours, cooled and distributed carefully between ether-saturated bicarbonate solution. The aqueous layer is then washed with ether, acidified, extracted with chloroform and the chloroform removed. The residue is recrystallized from hexane to yield α-(2-biphenylenyl)-propionic acid, m.p. 135–138° C.

When the compounds of Table V, Example 4 are used in place of the nitrile in the above example, then the corresponding products of Table VI below are obtained:

TABLE VI

α-(3-methyl-2-biphenylenyl)-propionic acid
α-(3-methoxy-2-biphenylenyl)-propionic acid
α-(3-chloro-2-biphenylenyl)-propionic acid
α-(3-bromo-2-biphenylenyl)-propionic acid
α-(3-amino-2-biphenylenyl)-propionic acid
α-(3-dimethylamino-2-biphenylenyl)-propionic acid
α-(3-mercapto-2-biphenylenyl)-propionic acid
α-(3-methylthio-2-biphenylenyl)-propionic acid
α-(3-phenyl-2-biphenylenyl)-propionic acid
α-(3-benzyl-2-biphenylenyl)-propionic acid
α-(3,6-dimethoxy-2-biphenylenyl)-propionic acid
α-(3,6-dihydroxy-2-biphenylenyl)-propionic acid
α-(3,6-dichloro-2-biphenylenyl)-propionic acid
α-(6-methoxy-2-biphenylenyl)-propionic aicd
α-(5-fluoro-2-biphenylenyl)-propionic acid
α-(6-fluoro-2-biphenylenyl)-propionic acid
α-(6-methylthio-2-biphenylenyl)-propionic acid
α-(6-methylsulfinyl)-2-biphenylenyl)-propionic acid.

We claim:
1. A method of treating a condition exhibiting at least one of the symptoms of pain, fever and inflammation which comprises the administration to a patient in need of such treatment of a therapeutically effective amount of 6-cyanobiphenylene-2-acetic acid.
2. A method of treating a condition exhibiting at least one of the symptoms of pain, fever, and inflammation which comprises the administration to a patient in need of such treatment of a therapeutically effective amount of 3-chlorobiphenylene-2-acetic acid.
3. A method of treating a condition exhibiting at least one of the symptoms of pain, fever and inflammation which comprises the administration to a patient in need of such treatment of a therapeutically effective amount of 6-fluorobiphenylene-2-acetic acid.
4. A method of treating a condition exhibiting at least one of the symptoms of pain, fever and inflammation which comprises the administration to a patient in need of such treatment of a therapeutically effective amount of 6-methoxybiphenylene-2-acetic acid.

References Cited

Chem. Abst., vol. 57, Subject Index A-I, p. 396S (1962).
Chem. Abst., vol. 68, 59353 Z (1968).

STANLEY J. FRIEDMAN, Primary Examiner

U.S. Cl. X.R.

424—317